W. S. HARLEY.
SHOCK ABSORBER FOR HANDLE BARS.
APPLICATION FILED OCT. 15, 1917.
1,262,787. Patented Apr. 16, 1918.
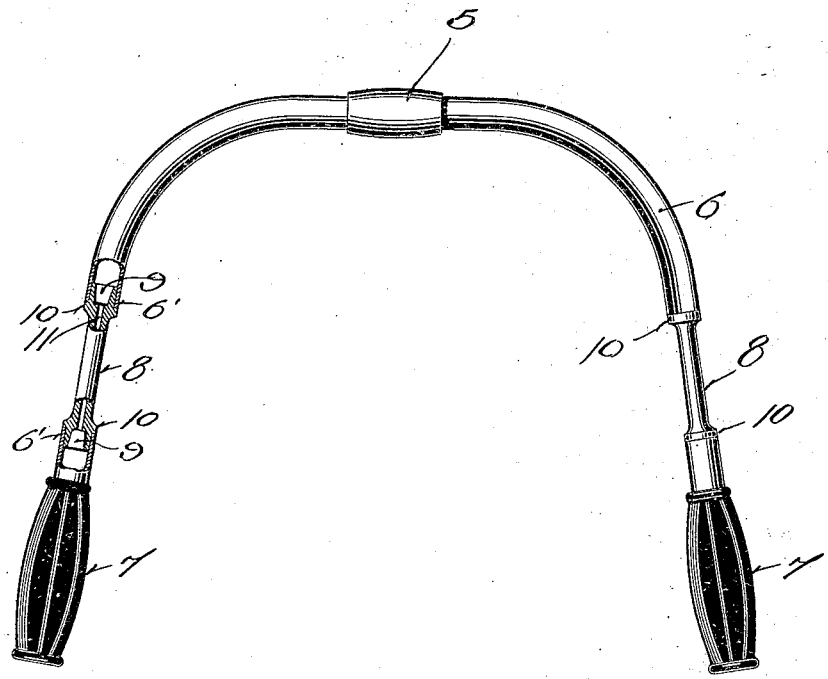

UNITED STATES PATENT OFFICE.

WILLIAM S. HARLEY, OF MILWAUKEE, WISCONSIN, ASSIGNOR TO HARLEY-DAVIDSON MOTOR CO., OF MILWAUKEE, WISCONSIN.

SHOCK-ABSORBER FOR HANDLE-BARS.

1,262,787. Specification of Letters Patent. Patented Apr. 16, 1918.

Application filed October 15, 1917. Serial No. 196,634.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Shock-Absorbers for Handle-Bars; and I do hereby declare that the following is a full, clear, and exact description thereof.

My invention relates to certain new and useful improvements in handle bars for motor-cycles, bicycles, or the like, and has for its primary object to provide a resilient shock absorbing connection between the usual hand grips and the handle bar proper.

A further object of the present invention is to provide a shock absorbing device for handle bars, which will be capable of attachment to handle bars now in use, or to handle bars at the time of their manufacture at a very low cost, all things being considered.

With the above and other objects in view, which will appear as the description proceeds, my invention resides in the novel construction, combination, and arrangement of parts, substantially as hereinafter described and particularly defined by the appended claims, it being understood that such changes in the precise embodiment of the herein disclosed invention may be made as come within the scope of the claims.

In the accompanying drawings, I have illustrated one complete example of the physical embodiment of my invention constructed according to the best mode I have so far devised for the practical application of the principles thereof, in which:—

The single view is a top plan view of a handle bar with parts broken away and in section to more clearly illustrate the structural details.

Referring now more particularly to the accompanying drawing, the numeral 5 designates a handle bar support or standard of any desired type in which is mounted the yoke of a handle bar 6, and intermediate its handles or grips 7, the handle bar 6 is cut away and a resilient shock absorbing bar 8 inserted therebetween, as hereinafter described.

The insert or shock absorber 8 consists of a round metal bar of a diameter sufficient to permit the resilient movement thereof in any direction and still be of sufficient strength to perform its desired functions, and has its ends 9 enlarged to engage the ends 6' of the bar 6 and has adjacent each enlarged end 9 a radial flange 10 to abut the ends 6' of the bar, as readily shown in the drawing. As will be obvious, the ends 9 of the shock absorbing insert are brazed or otherwise secured in the ends of the handle bar 6, and extending through the entire length of each insert 8 is a central aperture 11 to provide for the passage therethrough of the usual control wire or shaft (not shown) leading from the hand grips to the engine of a motorcycle, (not shown).

From the foregoing description taken in connection with the accompanying drawing it will be readily apparent that my device may be easily applied to any type of handle bar by cutting out a portion of the bar intermediate the ends thereof and inserting my device in the manner hereinbefore described.

I claim:—

1. The combination with a handle bar and a grip therefor, the adjacent ends of the handle bar and grip being tubular, of a shock absorbing element intermediate the handle bar and grip and comprising a resilient bar having its ends enlarged for engagement in the tubular ends of said handle bar and grip and secured therein, each of said enlarged ends having a radial flange, said flanges being in abutting relation with the ends of the handle bar and grip respectively.

2. The combination with a handle bar and a grip therefor, of a shock absorbing element intermediate the handle bar and grip and comprising a resilient metal bar having its ends enlarged for engagement with said handle bar and grip and secured therein, and having an aperture extending therethrough for control cables, substantially as described.

In testimony that I claim the foregoing I have hereunto set my hand at Milwaukee, in the county of Milwaukee and State of Wisconsin.

WILLIAM S. HARLEY.

Copies of this patent may be obtained for five cents each, by addressing the "Commissioner of Patents, Washington, D. C."